United States Patent [19]

Lee

[11] Patent Number: 5,235,594
[45] Date of Patent: Aug. 10, 1993

[54] TIME DIVISION MULTIPLEX VOICE DATA BUS

[75] Inventor: Paul O. Lee, Laurel, Md.

[73] Assignee: Westinghouse Electric Corp., Pittsburgh, Pa.

[21] Appl. No.: 743,477

[22] Filed: Aug. 9, 1991

[51] Int. Cl.$^5$ .............................................. H04J 3/02
[52] U.S. Cl. .................... 370/85.9; 370/85.1; 370/85.11
[58] Field of Search ............... 370/85.9, 85.11, 85.1

[56] References Cited

U.S. PATENT DOCUMENTS

4,564,938  1/1986  Boot .................................. 370/85.11
4,608,685  8/1986  Jain et al. ........................ 370/85.9 X Primary Examiner—Douglas W. Olms
Assistant Examiner—Russell Blum

[57] ABSTRACT

In a switching system for voice input/output devices, voice data is sampled, e.g., at an 8 KHz rate. To minimize overhead, the maximum number of devices in a system have a time slot for outputting data. Thus, the system operates at a system clock rate of 8 KHz times the maximum number of devices to be supported. In the illustrated embodiment, 768 devices are supported and thus the system operates at a 6.144 MHz clock rate. To enable such a large number of devices to be supported at a relatively slow clock rate, the data is transmitted in parallel. The switching system is constructed as N buckets or cabinets of M processing modules, each connected to J devices. A bus controller for each bucket connects the multiprocessing system bus in that bucket to intersystem buses connected to bus controllers in adjacent cabinets. Voice data samples are collected by a module collection bus and transferred to a bucket collection bus following data from any preceding buckets. When the final bus controller is reached, the collected voice data passes through a return bus which connects the bucket collection bus entering the final bus controller to a bucket distribution bus exiting the final bus controller. The bus controllers route the data on the bucket distribution bus to all of the processing modules connected thereto on a module distribution bus and pass the distribution data on to the next bus controller.

10 Claims, 7 Drawing Sheets

TIME DIVISION MULTIPLEX VOICE DATA BUS

BACKGROUND OF THE INVENTION

Field of the Invention

The present invention is directed to a voice bus in a telecommunication switching system and, more particularly, to a time division multiplex voice data bus in a distributed processing telecommunication switch.

Description of the Related Art

Known telecommunication switching systems for locally connected terminal equipment which are commonly used in applications, such s private branch exchanges, are typically one of two types. The first type uses a centralized processing system. This centralized processing system controls all input/output operations for the entire system and thus must have sufficient capacity to handle a maximum amount of terminal equipment, i.e., telephones, facsimile machines, etc. When used at maximum capacity, the first type of system can be very efficient. However, the ability to expand the system or to use the same type of system at many installations having varying amounts of terminal equipment is often desired. The first type of switching system with its centralized processing system will not be run at maximum efficiency at most installations.

The second type of conventional switching system is designed to provide greater flexibility by using distributive modules. Each module usually uses a processor to control several terminal devices. The modules are connected together so that data and voice samples can be interchanged. This design enables the second type of switching system to provide higher efficiency in a larger number of applications than the first type of system, by adding or removing modules. In the second type of conventional switching system, synchronous communication is typically used for samples and asynchronous communication is typically used for control data. There are inefficiencies in both of these types of switching systems.

SUMMARY OF THE INVENTION

An object of the present invention is to provide a highly efficient voice bus structure for a telecommunication switching system.

Another object of the present invention is to provide a time division multiplex bus structure for a distributed data processing system.

A further object of the present invention is to provide an inexpensive bus structure for a distributed data processing system.

The above objects are attained by providing a time division multiplex communication bus structure for connecting a plurality of processing modules, comprising: at least one parallel multiprocessing system bus connected to the processing modules, each parallel multiprocessing system bus receiving new data from only one of the processing modules at a time and simultaneously distributing old data to all of the processing modules connected thereto; and at least one parallel intersystem bus, operatively connected to the at least one parallel multiprocessing system bus, for sequentially receiving the new data from each of the processing modules connected to each parallel multiprocessing system bus and for distributing the new data as the old data to each parallel multiprocessing system bus.

Each multiprocessing system bus is connected to at least one intersystem bus by a bus controller. When there are a plurality of multiprocessing system buses, adjacent bus controllers are connected by an intersystem bus. The bus controllers transfer new data collected from a corresponding multiprocessor system bus and output the new data to a following intersystem bus. If the bus controller is connected to a preceding bus controller via an intersystem bus, the data from the immediately preceding bus controller and any other preceding bus controllers are output prior to the data from the corresponding system bus. Following the final bus controller, a return bus receives the new data from all of the bus controllers in the system and supplies the new data as old data to the final bus controller for distribution to all of the multiprocessing systems.

An initial bus controller generates a clock signal, a bucket enable pulse and a frame signal which control the timing of data collection. Any other bus controllers in the system use the clock signal, bucket enable pulse and frame signal generated by the initial bus controller which are output as collection control signals accompanying the data from the initial bus controller. The clock signal is delayed in each bus controller by an amount less than the period of the clock signal, but more than the amount of propagation delay of the data from one bus controller to another. This ensures that the data is present, prior to being clocked. The bucket enable pulse is delayed by the length of the bucket enable pulse in each bus controller. While the bucket enable pulse is present in a bus controller, each of the positions on a multiprocessing bus for a processing module are supplied with control signals to enable the processing module if it is present. The length of the bucket enable pulse is equal to the maximum number of processing modules in a bucket or multiprocessing system times the maximum number of devices which may be connected to a processing module. The frame signal is generated each time the maximum number of devices in an entire system have had one opportunity to output data.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
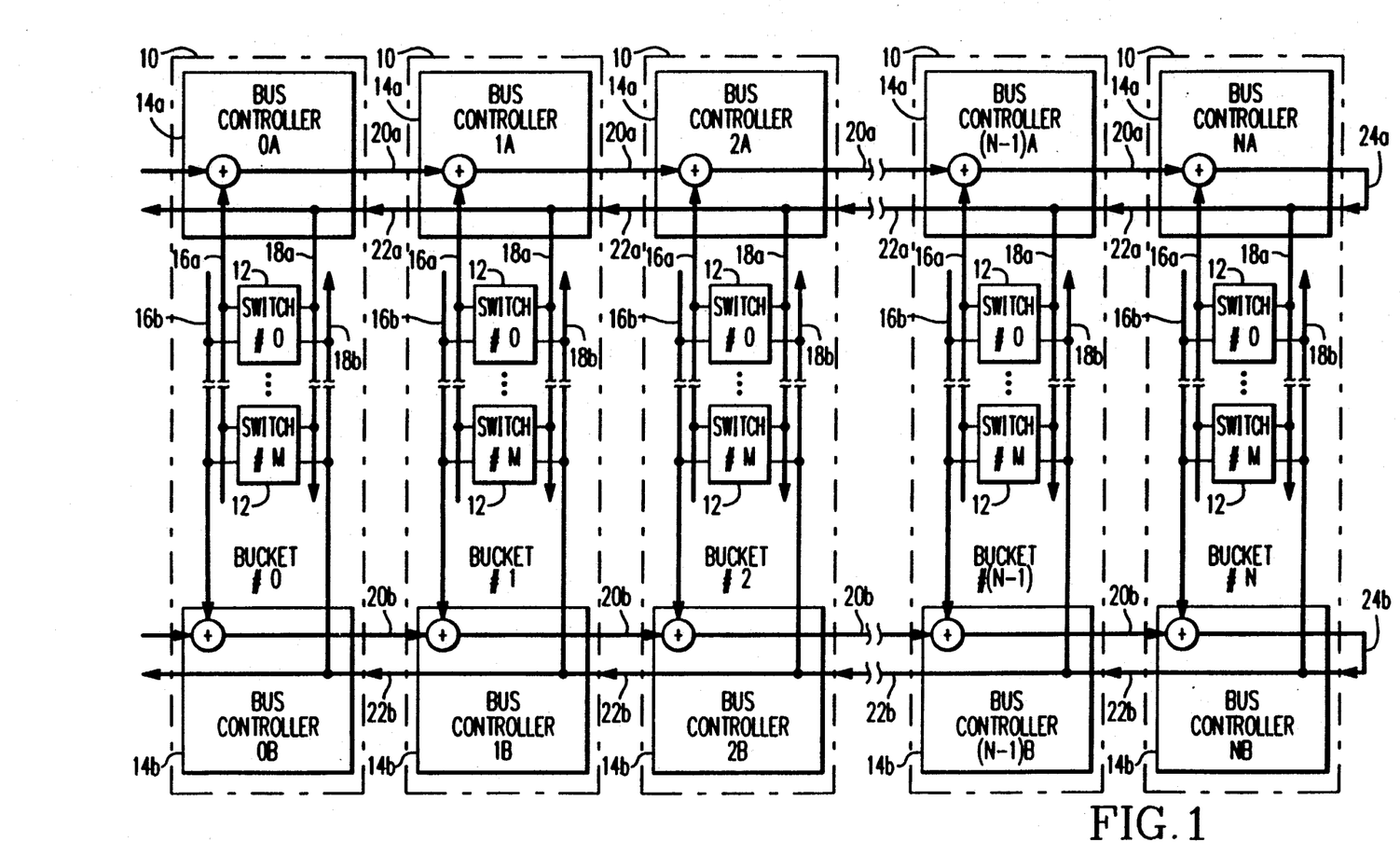
FIG. 1 is a block diagram of the overall bus architecture according to the present invention.

An embodiment of the present invention is illustrated in FIG. 1 in which a distributed voice switching system has N buckets 10 in physically separated cabinets. Each bucket 10 has a maximum of M switch units or processing modules 12. In the illustrated embodiment of the present invention, the bus architecture is used in a telephone switching system in which each processing module 12 provides switching operations for up to eight devices, six of which are bidirectional and two of which are receive only.

Each bucket in the embodiment illustrated in FIG. 1 is physically located in a separate cabinet and includes two bus controllers 14 and two parallel multiprocessing system buses, each connected to a different bus controller 14 in a bucket 10. For example, in bucket #1 (second from the left) the bus controller 14A for the A bus is connected to a parallel multiprocessing system bus formed by a module collection bus 16A and a distribution bus 18A, while the bus controller 14B for the B bus is connected to a module collection bus 16B and a module distribution bus 18B. The bus controllers 14 in the other buckets 10 are similarly connected to module collection buses 16 and module distribution buses 18. In each bucket 10, the module collection and distribution buses 16, 18 for the A bus form one logical backplane, while those for the B bus form another logical backplane, but are preferably on a single physical backplane. The bus controllers 14 in each bucket 10 may be located on opposite ends of the backplanes.

The present invention is not limited to a system having redundant buses and therefore, details of how voice data transmission is transferred from one bus to another will not be discussed herein. Additional details of the construction and operation of the illustrated embodiment, including switching from one bus to another, are provided in copending applications filed on the same day as this application and incorporated herein by reference, entitled REDUNDANT SYNCHRONOUS MESSAGE BUS ARCHITECTURE, by Mark Hayman and Paul Lee; DISTRIBUTED PROCESSING TELECOMMUNICATION SWITCH WITH STANDARDIZED SWITCH UNITS by Chester Younkin and Stephen Wigler; and REDUNDANT BUS SWITCHOVER by Paul Lee and Andrew Turgeon, all of which are commonly owned with the present invention.

The bus controllers 14A for the A bus are connected together by parallel intersystem buses formed by a pair of bucket collection buses 20A and bucket distribution buses 22A, while the bus controllers 14B for the B bus are connected together by bucket collection and distribution buses 20B and 22B. As described below in more detail, voice data collected by one bus controller 14 (e.g., in bucket #1) are passed to a following bus controller 14 (e.g., in bucket #2) via a bucket collection bus 20. The following bus controller (e.g., in bucket #2) outputs the data collected by the preceding bus controller 14 (e.g., in bucket #1) to a following multiprocessing system (e.g., bucket #3) and then immediately collects data from the processing modules 12 connected to a corresponding system bus (e.g., the processing modules 12 in bucket #2). The bus controllers 14A, 14B in the final collection bucket #N each outputs the data collected from all of the buckets 10 to a return bus 24 which supplies the data to a distribution bus 22.

In the illustrated embodiment of the present invention, the time division multiplex communication bus structure is used to provide a telephone switching system which transmits voice data samples. A 6.144 MHz clock is divided down to 8 KHz and used to sample voice signals using pulse code modulation (PCM). Each processing module 12 is designed to support a predefined amount of voice input/output equipment. In the illustrated embodiment, each processing module 12 supports six input devices and thus produces six samples of data every 125 μsec. Each sample is one byte or eight bits in length.

The specific numbers used in the illustrated embodiment were selected due to conventional voice sampling rates, the maximum number of devices to be supported by the entire system and the maximum number of devices to be connected to each processing module. By increasing the system clock rate, additional devices could be supported by the system. The number of bytes output in a single frame by each processing module 12 could be increased or decreased depending upon the number of devices to be supported by each processing module 12.

Figure 2:
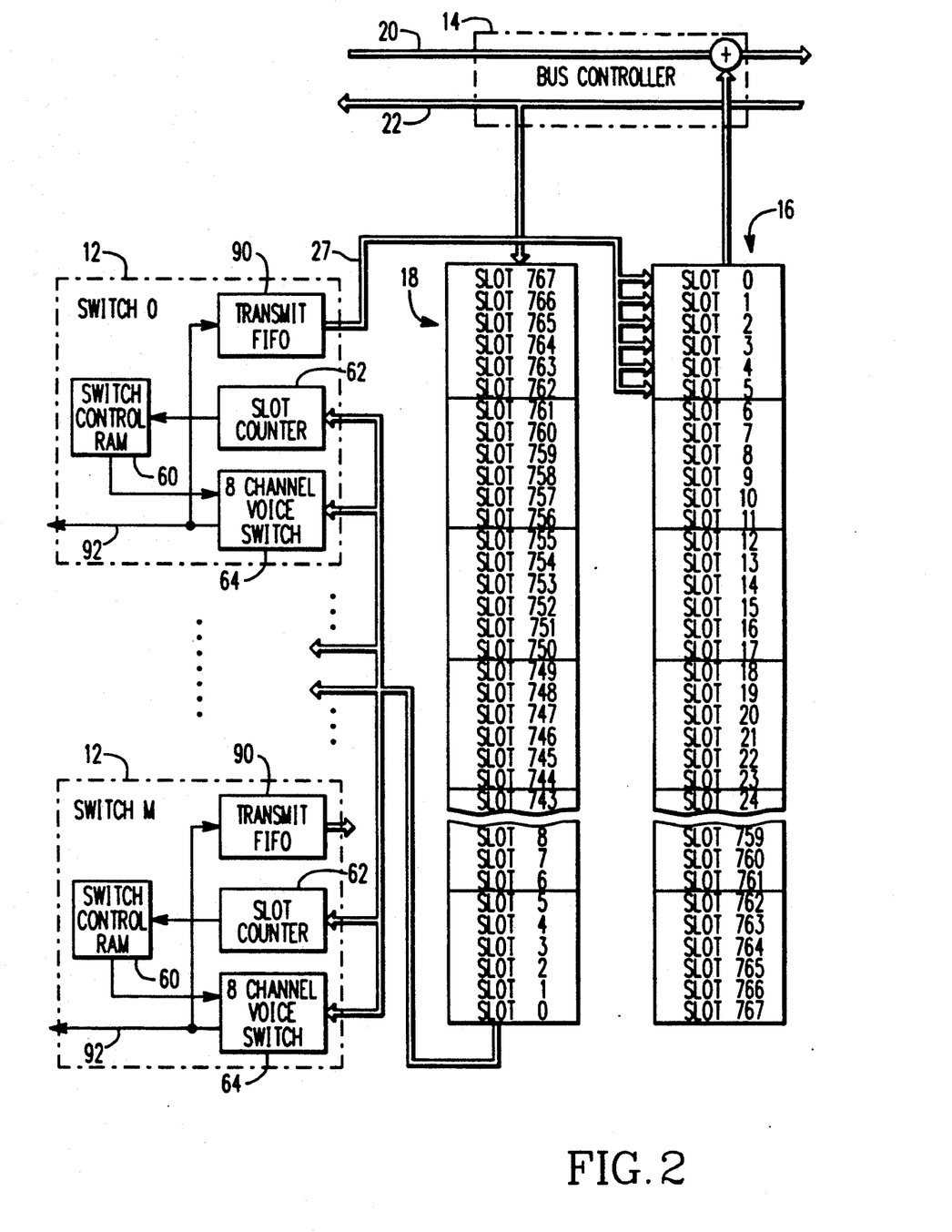
FIG. 2 is a block diagram illustrating the predefined time slots for voice data on the module collection and distribution buses.

FIG. 2 provides an illustration of how data from the processing modules 12 in a bucket 10 are output onto the module collection bus 16 and received from the module distribution bus 18. In FIG. 2, the beginning and ending slots of one frame of data being collected and one frame of data being distributed are illustrated, where one frame of data includes one sample or byte of data (if any) from each device connected to each switch 12. In reality, only the voice data for a single slot is present on either the module collection bus 16 or the module distribution bus 18 at any given time. All of the slots for one frame are illustrated in FIG. 2 to convey the sequence of slots for one frame.

Figure 3:
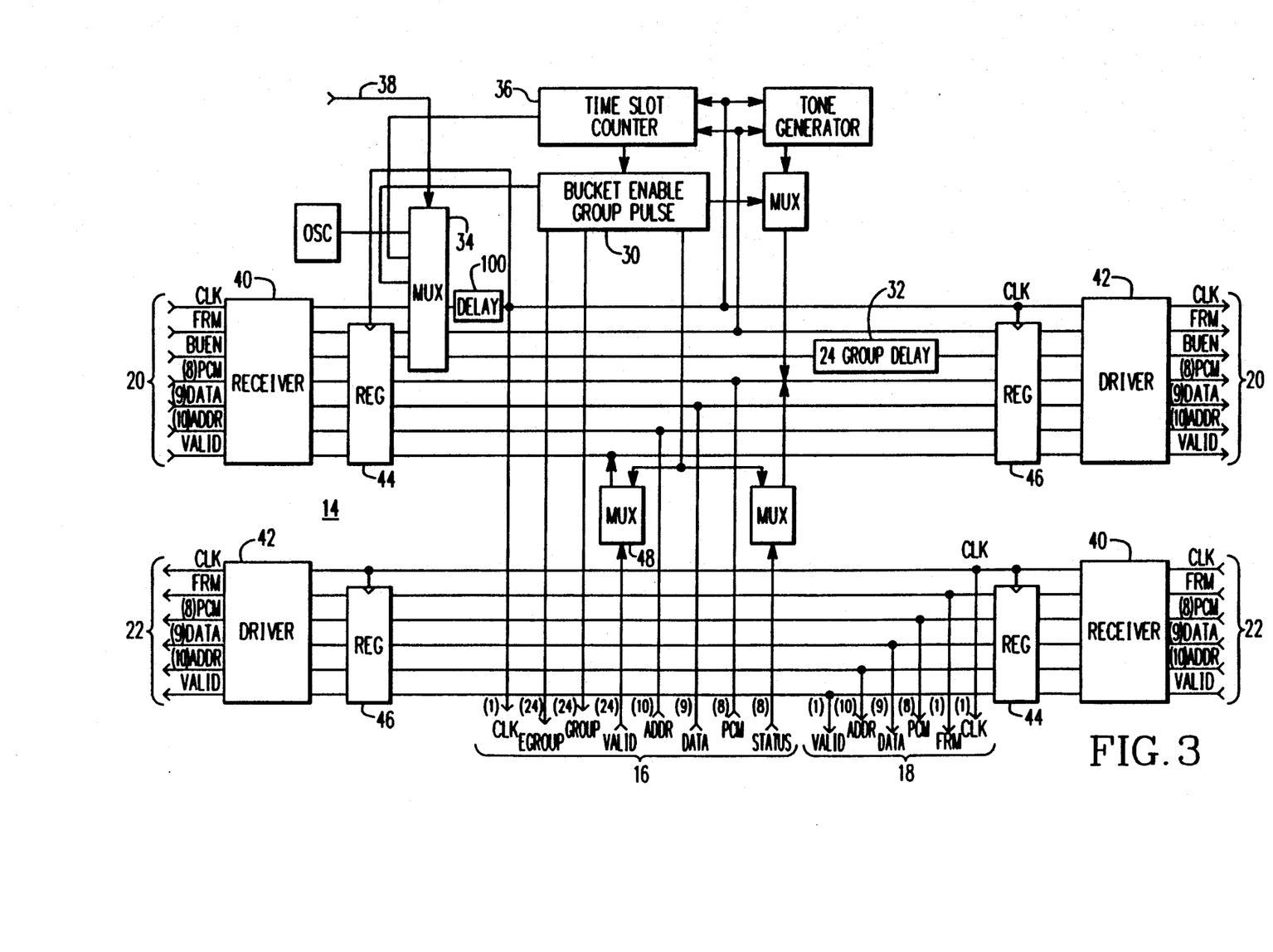
FIG. 3 is a block diagram of a bus controller.

Each of the bus controllers 14 are constructed identically, as indicated by the block diagram in FIG. 3. However, the bus controllers 14 in bucket #0 and bucket #N have slight differences in their operation due to being at the ends of the bucket collection and distribution buses 20, 22. The operation of the bus controller 14 in FIG. 2 will be described for bucket #0 and the differences will be noted for the other buckets 10.

The bus controllers 14 in bucket #0 each generates a bucket enable pulse in a bucket enable pulse group circuit 30. Following buckets 10 receive the bucket enable pulse (BUEN) on the bucket collection bus 20 from a preceding bus controller 14, i.e., the bus controller 14A in bucket #1 receives BUEN from the bus controller 14A in bucket #0. As illustrated in FIG. 3, the bucket enable pulse is delayed in a 24 group delay 32 prior to being transmitted to the bus controller 14A in the following bucket (e.g., bucket #2) via the bucket collection bus 20. The bucket enable pulse generated by circuit 30 has a length equal to the maximum number of voice input/output devices (6) connectable to one processing module 12 times the maximum number of processing modules 12 in a bucket 10 (M or 24). Thus, the length of the bucket enable pulse is the same as the delay in 24 group delay 32.

The bucket enable pulse from circuit 30 is supplied to a multiplexer 34. A time slot counter 36 determines when the bucket enable pulse is to be generated and supplied to the multiplexer 34. A control signal 38 determines whether the multiplexer 34 selects the bucket enable pulse from the circuit 30 or the bucket enable pulse BUEN on the bucket distribution bus 20. The control signal 38 may be made by control means such as a jumper connected to either ground or a power supply line, such as +5 volts. All of the bus controllers 14 except the bus controllers 14 in the initial bucket 10, i.e., bucket #0, will have the same signal (e.g., ground) supplied to the multiplexer 34. Only the bus controllers 14 in bucket #0 will have a control signal 38 supplied to the multiplexer 34 indicating selection of the bucket enable pulse from circuit 30.

During the presence of the bucket enable pulse, control signals are output to the processing modules 12 on the module collection bus 16. These control signals are generated by the bucket enable group pulse circuit 30 and include EGROUP and GROUP signals. In the illustrated embodiment, the maximum number M of processing modules 12 in a bucket 10 is twenty-four. As indicated in FIG. 3, there is one EGROUP signal and one GROUP signal for each of the processing modules 12 in a full bucket 10. The process of enabling drivers in the processing modules 12 will be described in more detail below.

The first processing module 12 to be enabled is switch #0 which uses the first six slots in a group. Since bucket #0 is the first bucket, switch #0 in bucket uses the first six slots (slots 0-5) in the frame. In the sampled data portion (PCM) of the module collection bus 16, each of the six slots corresponds to one byte of sampled data from one of the up to six input devices connected to switch #0. FIG. 2 shows how six slots are used by switch #0, but this portion of FIG. 2 is logical, not physical, i.e., the data and addresses of the six slots are not output simultaneously; rather the slots in the frames illustrated in FIG. 2 are generated sequentially with the data and address in each slot written in parallel as indicated by the numerals in parentheses in FIG. 3.

While data is being collected on the module collection bus 16, data is being distributed on the module distribution bus 18. As noted above, data is collected by the module collection bus 16 from only one processing module 12 at a time; however, data is output to all of the processing modules 12 in a bucket 10 at the same time. As indicated in FIG. 1, the data (including PCM data, message data and message destination address) from switch #0 of bucket #0 is passed from the bus controller 14 in bucket #0 to bucket #1 and thence eventually to bucket #N. After passing through the return bus 24, the data in slot #0 of the frame is first distributed to the switching modules in bucket #N, then those in bucket #(N-1) and so on until finally slot #0 of the frame reaches bucket #0. As indicated in FIG. 2, the data in slot #0 is distributed to all of the processing modules 12 and during the next clock pulse, the data in slot #1 is distributed.

As indicated in FIG. 3, each bus controller 14 has two sets of receivers 40 and drivers 42. One set is connected to the bucket collection bus 20 and the other to the bucket distribution bus 22. Registers 44, 46 hold the data received by the receivers 40 and to be transmitted by the drivers 42, respectively.

If a bucket 10 is not full of processing modules 12, the data collected, during a group of slots corresponding to the position where the missing processing module(s) 12 would be located, will not contain valid data. A validity portion (VALID) of the module collection bus 16 indicates whether the data being collected is valid, i.e., output from a processing module 12 in the bucket 10. The indications of validity can be provided by using twenty-four separate lines each supplied to a different processing module which is grounded when the processing module is inserted in a bucket, but otherwise held at a different logical voltage, e.g., +5 volts, in a conventional manner. Other information, such as STATUS of a processing module may also be collected by the module collection bus 16. Since only one of the lines in the validity portion VALID of the module collection bus 16 is relevant at any given time, a multiplexer 48 selects the relevant validity signal and outputs it to a one-bit VALID line on the bucket collection bus 20 for eventual distribution on the module and bucket distribution buses 18, 22. The beginning or end of a frame can be indicated by a frame bit distributed on line FRM.

Figure 4:
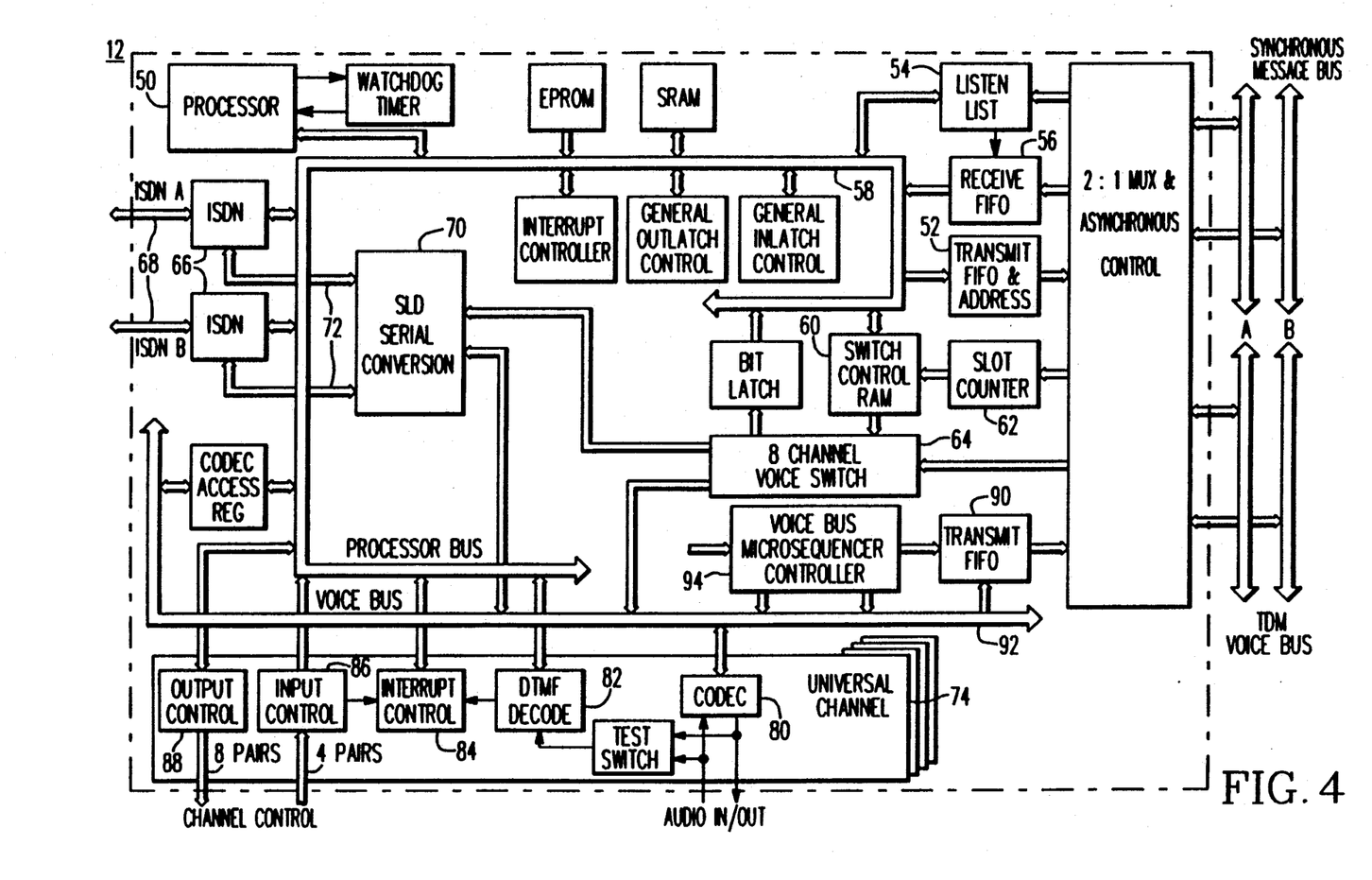
FIG. 4 is a block diagram of a processing module or switch board.
Figure 5:
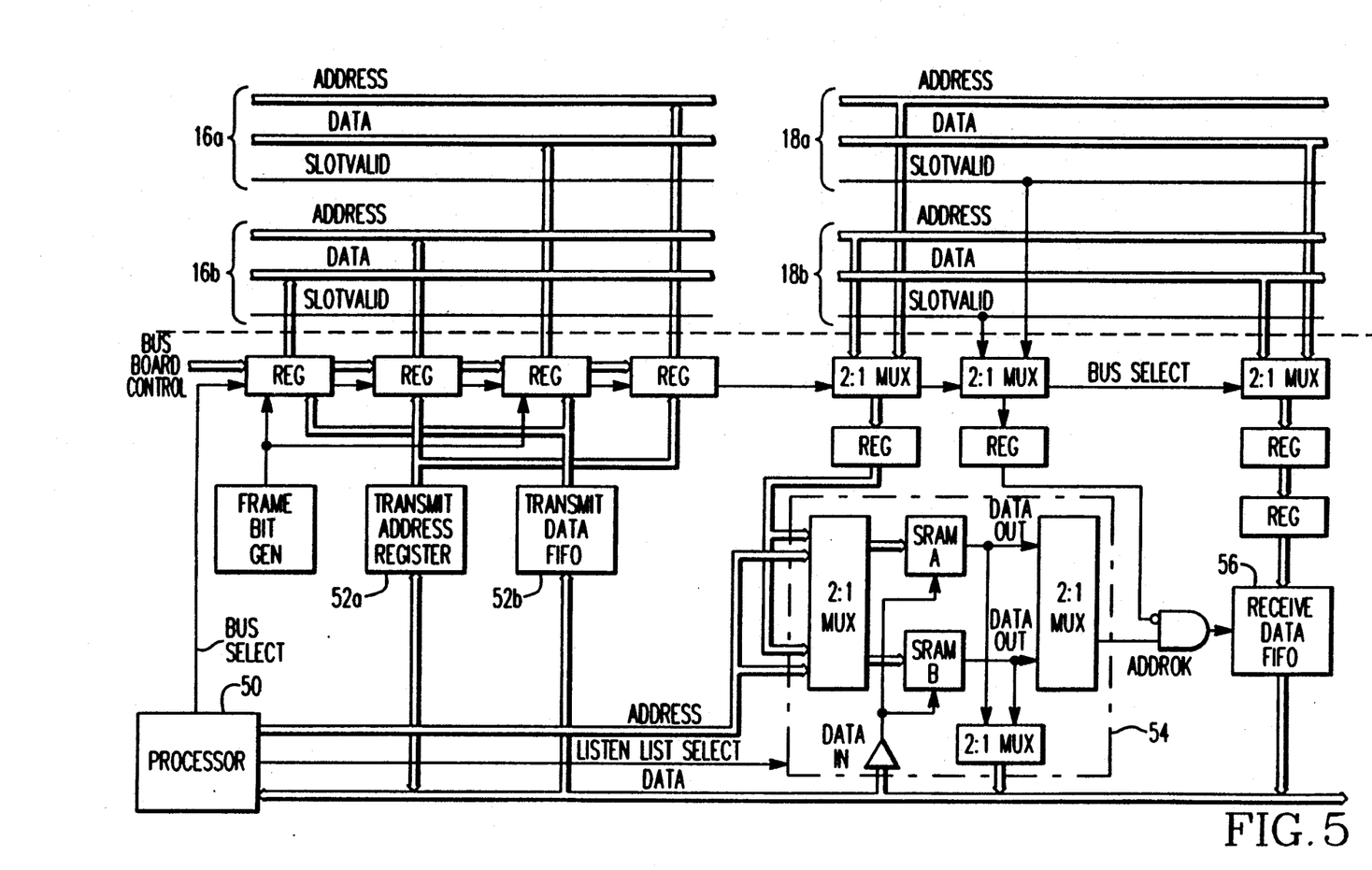
FIG. 5 is a block diagram of the bus interface portion of a switch board; and ·

A detailed block diagram of a switch board 12 is illustrated in FIG. 4. As would be expected, all processing modules include at least one processor 50, such as an INTEL 80C186. Message data and addresses are output from a transmit FIFO 52 and an address register (not shown in FIG. 4). The destination address and message data on the module distribution bus 18 are received by a listen list 54 and a receive FIFO 56, respectively. Details of the listen list construction are provided in FIG. 5. The processor 50 supplies the data to be transmitted to the transmit FIFO 52 via a processor bus 58.

The listen list 54 determines which messages will be output from the receive FIFO 56 to the processor bus 58. Preferably, the listen list is a single bit, double buffered RAM, so that in the case of the illustrated embodiment there are 2 Kbits, each bit indicating whether the address of that bit is to be listened to by the processing module 12. Two copies of a 1 Kbit list are maintained in the listen list unit 54. Changes are made to one copy while the other copy is active and then the updated list is made the active list while the second copy is updated. If the destination address on the module distribution bus 18 addresses a "1" bit in the listen list 54, the receive FIFO 56 is incremented and the data in the message data portion of the module distribution bus 18 will be stored and eventually will be output to the processor 50.

Initially, two bits are set in the listen list 54. The first bit indicates an identifying address providing unique identification for the processing module 12 and the second bit indicates a broadcast address. In the case of the identifying address, that bit in the listen list will not be set to "1" in any of the other processing modules 12, while the broadcast bit is set to "1" in all of the processing modules 12. In addition, multicast bits may be set to permit a group of processing modules 12, but not all of the processing modules 12, to be addressed by a single message.

A list similar to the listen list 54 is maintained in a switch control RAM 60 for the sampled data which in the illustrated embodiment is voice data. Unlike the listen list 54 which uses the destination address to address the bits in the list, the switch control RAM 60 receives the address of the originating device from a slot counter 62. As described above, each processing module 12 has a group of six slots assigned thereto, with processing module #0 in bucket #0 having the first six slots (slots 0-5) and processing module #M in bucket #N having the last six slots (slots 762-767). By resetting the slot counter 62 upon receipt of the frame bit, not only the group, i.e., the processing module 12, but also the slot within the group which output the sampled data, can be determined.

When an operator of a device connected to one processing module 12 wishes to communicate to a device connected to another processing module 12, a message is sent from the processing module 12 connected to the originating device using the identifying address of the remote device in the destination address. Since this address will have a corresponding bit set in only the remote processing module's listen list 54, in only that processing module 12 the message will be received by the receive FIFO 56. The message will instruct the processor 50 to set a bit in the switch control RAM 60 corresponding to the slot number of the originating device. The slot counter 62 counts the clock signals CLK since being reset by the frame signal FRM on the module distribution bus 18 and outputs the count value to the switch control RAM 60. When the sampled voice data from the originating device is distributed in its slot in a frame, an eight channel voice switch 64 in the remote module will output the voice data under the control of the switch control RAM 60 to the destination device.

In the embodiment illustrated in FIG. 4 there are two types of devices which may be connected to the switch board 12. Digital devices which communicate according to the integrated systems digital network (ISDN) standard may be connected to one of two ISDN interface units 66. If desired, the ISDN interfaces 66 may be connected to the same device to provide redundant communication paths via ISDN data links 68. An appropriate conversion unit 70 is provided to convert from the sampled voice data output by the eight channel voice switch 64 to serial communication links 72 so that conventional interface units, such as an AM2085 from Advanced Micro Devices of Sunnyvale, Calif., may be used for the ISDN interface units 66.

Analog devices may be connected to a switch board 12 via a universal channel 74. As indicated in FIG. 4, four universal channels may be included, one for each analog device, such as an analog telephone, radio, etc. The universal channel 74 may be formed of conventional components, including a coder/decoder (CODEC) 80, a dual tone multi-frequency decoder 82, interrupt controller 84 and input and output controllers 86, 88. The voice data from the converter 70 for the ISDN interfaces 66 and from the CODEC 80 is supplied to a voice data transmit FIFO 90 via a voice bus 92 which is controlled by a microsequencer controller 94.

Figure 6:
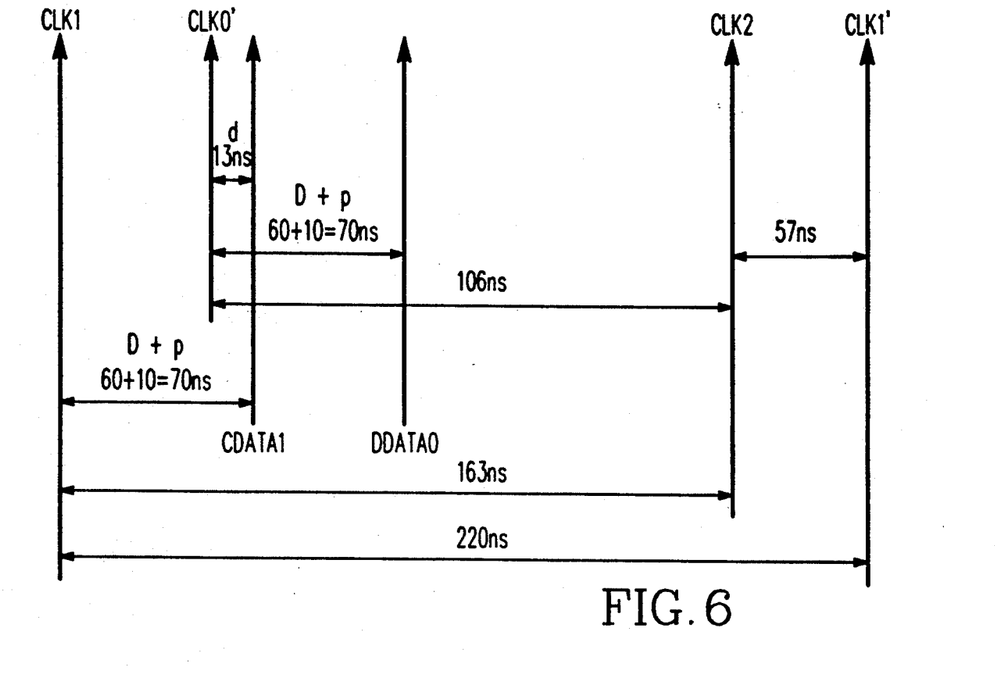
FIGS. 6–8 are timing diagrams of voice data transmission between two bus controllers.
Figure 7:
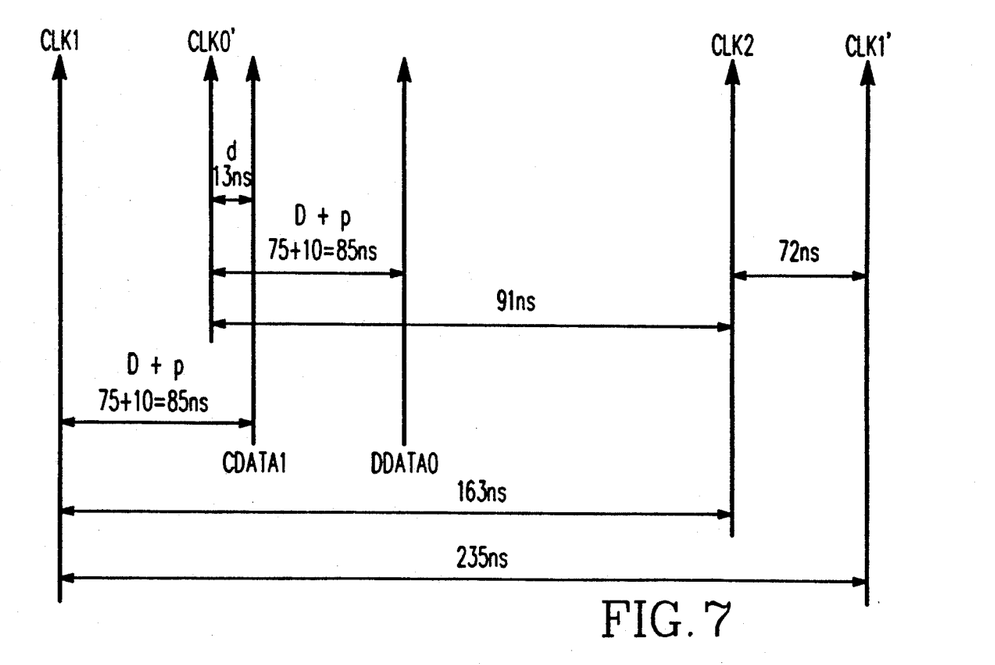

Timing diagrams for 20 foot and 30 foot intersystem bus cables are illustrated in FIGS. 6 and 7, respectively. In the figures a D represents the propagation delay from a driver 42 in one bus controller through an intersystem bus (20 or 30 foot cable) to a receiver 40 in another bus controller. In the preferred embodiment, the driver 42 and receiver 40 are conventional RS-422 devices, such as model numbers 26C31 and 26C32, respectively, from National Semiconductors. These devices connected by a 20 foot cable have a propagation delay of approximately 60 ns. The delay in register 44 required to get data in position to be latched is represented by p. In the preferred embodiment, the registers 44, 46 are 74LS374 from Texas Instruments and have a delay of approximately 10 ns. Thus, the time required from the active edge CLK1 of the clock pulse CLK1 in a preceding bus controller to the time the collected new data CDATA1 is available in a following bus controller is D+p. In the case of a 20 foot cable, the time from CLK1 to CDATA1 is 70 ns, as illustrated in FIG. 6, while the additional 15 ns delay of a 30 foot cable produces a total delay of 85 ns, as illustrated in FIG. 7.

Since a 44 MHz clock has a clock period of 163 ns, the illustrated embodiment of the present invention has the following timing. The next active edge CLK2 of the clock signal in the preceding bus controller 14 occurs 163 ns after CLK1, as illustrated in FIGS. 6 and 7. In the preferred embodiment, a delay circuit 100 (FIG. 4) delays the clock signal output by the multiplexer 34 prior to use of the clock signal by the registers 44, 46 and the module collection bus 16. In the preferred embodiment, this delay is slightly less than the period of the clock signal, but preferably is more than the total propagation delay D+p. As illustrated in FIGS. 6 and 7, the clock signal is delayed by 150 ns, or 13 ns less than the period of the clock signal. This is equivalent to a negative delay of d where d is 13 ns. The clock signals in the following bus controller which correspond to the clock signals in the preceding bus controller are indicated by prime marks, i.e., CLK1' is the active edge of the clock pulse in the following bus controller which appeared as the active edge CLK1 in the preceding bus controller. The propagation delay in the multiplexer 34 is equivalent to the delay time in the register 44. Since the propagation delay of the clock signal through a driver, a 20 foot cable, a receiver and a multiplexer is approximately 70 ns, after an additional 150 ns delay in delay circuit 100, the active edge CLK1' appears in the following bus controller 220 ns after the same active edge CLK1 appeared in the preceding bus controller. The 30 foot cable has 15 ns additional delay compared to a 20 foot cable, to produce a total delay of 235 ns, as indicated in FIG. 7.

The delay circuit 100 effectively provides a negative delay where the clock signal used to transmit the distribution data from the following bus controller to the preceding bus controller and to shift data from register 44 to register 46 on both the collection bus 20 and distribution bus 22 in the following bus controller uses an earlier clock signal from the preceding bus controller than was used to output the collected new data from the preceding bus controller which is about to arrive in the following bus controller. As illustrated in FIGS. 6 and 7, CLK0' which corresponds to an active edge of a clock signal generated in the preceding bus controller immediately prior to active edge CLK1, shifts the data from register 44 to 46 and outputs the data from register 46 on both the bucket collection bus 20 and bucket distribution bus 22. The data output on the bucket distribution bus 22 will be received in the preceding bus controller as DDATA0 after a propagation delay of D+p, as illustrated in FIGS. 6 and 7. Similar transfers of data on the bucket collection bus 20 from the preceding bus controller to the following bus controller and on the bucket distribution bus 22 from the following bus controller to the preceding bus controller will occur for the next active edges of the clock signals CLK2 and CLK1' in the preceding and following bus controllers, respectively.

Figure 8:
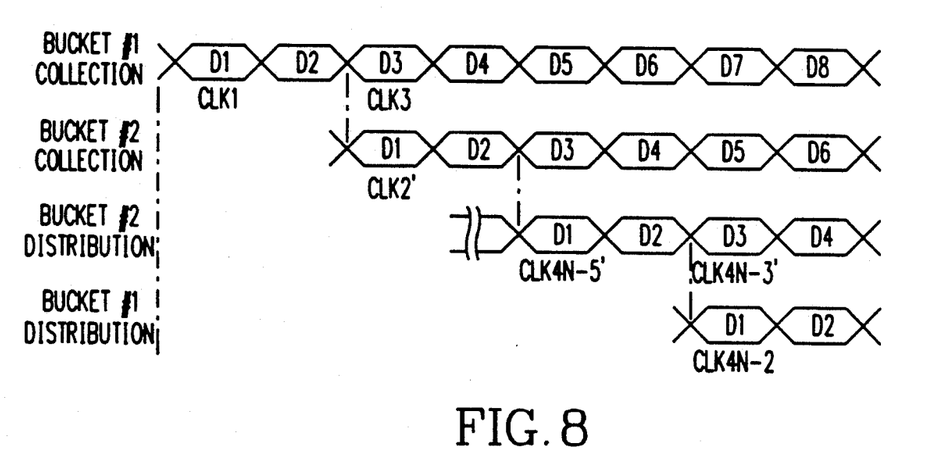

The result of the propagation delay in the bus controllers of a system having N buckets is illustrated in FIG. 8. At CLK1 in the bus controller 14 for bucket #1, data D1 is output. Due to the clocking delay, data D1 is latched by the bucket collection bus in the bus controller 14 for bucket #2 when the active edge CLK1' appears in bucket #2. When the active edge CLK2' appears in bucket #2, the data D1 is latched by the register 46 for the driver 42 of the bucket collection bus 20 in the bus controller 14 in bucket #2. As illustrated in FIGS. 6 and 7, CLK2 in bucket #1 occurs at about the same time as CLK1' in bucket #2. Thus, data D3 is latched for output from bucket #1 by CLK3 at about the same time that data D1 is latched for output by CLK2'. After the data has passed through the return bus 24 and any following bus controllers, the data D1 is latched in register 46 for output from the bus controller 14 for bucket #2 when CLK4N-5' appears in bucket #2. Similarly, data D1 is latched for output from bucket #1 when CLK4N-2 appears in bucket #1.

The many features and advantages of the present invention are apparent from the detailed specification, and thus it is intended by the appended claims to cover all such features and advantages of the system which fall within the true spirit and scope of the invention. Further, since numerous modifications and changes will readily occur to those skilled in the art from the disclosure of this invention, it is not desired to limit the invention to the exact construction and operation illustrated and described, accordingly, suitable modifications and equivalents may be resorted to, all falling within the scope and spirit of the invention.

What is claimed is:

1. A time division multiplex communication bus structure for connecting a plurality of processing modules, comprising:
   at least one parallel multiprocessing system bus connected to a first group of the processing modules, each parallel multiprocessing system bus receiving new data from only one of the processing modules in said first group at a time and simultaneously distributing old data to all of the processing modules connected thereto;
   at least one parallel intersystem bus, operatively connected to said at least one parallel multiprocessing system bus, for sequentially receiving the new data from each of the processing modules connected to said at least one parallel multiprocessing system bus and for distributing the new data as the old data to the processing modules in said first group via said at least one parallel multiprocessing system bus;
   at least one bus controller, each connecting a corresponding system bus from among said at least one parallel multiprocessing system bus to said at least one parallel intersystem bus, to transfer the new data from the corresponding system bus to said at least one parallel intersystem bus and to transfer the old data from said at least one parallel intersystem bus to the corresponding system bus;
   wherein said at least one bus controller comprises an initial bus controller generating a clock signal for providing timing in said time division multiplex communication bus structure and a bucket enable pulse for controlling receipt of the new data by each of said at least one parallel multiprocessing system bus,
   wherein said at least one parallel multiprocessing system bus distributes the clock signal to the processing modules connected thereto to provide timing for input/output operations of the processing modules connected thereto via said at least one parallel multiprocessing system bus, and
   wherein said at least one parallel intersystem bus distributes the clock signal and the bucket enable pulse to all of said at least one bus controller, except the initial bus controller.

2. A time division multiplex communication bus structure as recited in claim 1,
   wherein said at least one bus controller comprises a final bus controller, identical to the initial bus controller when a single multiprocessing system is connected to said time division multiplex communication bus structure, and
   wherein said at least one parallel intersystem bus comprises a return bus connected to the final bus controller for receiving therefrom the new data collected by all of said at least one bus controller from all of the processing modules and for returning to the final bus controller as the old data, the new data received therefrom.

3. A time division multiplex communication bus structure as recited in claim 2, wherein each of said at least one bus controller comprises:
   a counter to count cycles in the clock signal and output a first periodic signal and a count signal;
   a bucket control circuit, operatively connected to the corresponding system bus, to output a second periodic signal and module control signals for the processor modules connected to the corresponding system bus, in dependence upon the count signal;
   an oscillator to output an oscillating signal;
   designation means for generating a designation signal indicating which of said at least one bus controller is the initial bus controller;
   first and second receivers, operatively connected to the corresponding system bus and each connectable to one of said at least one parallel intersystem bus, said first receiver receiving the new data and collection control signals from any preceding bus controller and said second receiver receiving the old data and distribution control signals from the return bus via any following bus controllers;
   first and second drivers, operatively connected to said first and second receivers, respectively, and to the corresponding system bus and each connectable to one of said at least one parallel intersystem bus, said first driver outputting the new data collected from the processing modules connected to the corresponding system bus and the new data received by said first receiver and said second driver outputting the old data received by said second receiver to any preceding bus controller; and
   a multiplexer, operatively connected to said counter, said bucket control circuit, said oscillator, said designation means, said first receiver, said first driver and the corresponding system bus, to output the first and second periodic signals and the oscillating signal as a frame signal, the bucket enable pulse and the clock signal, respectively, when the designation signal received by said multiplexer indicates that said multiplexer is in the initial bus controller and otherwise obtaining the frame signal, the bucket enable pulse and the clock signal from the collection control signals received by said first receiver.

4. A time division multiplex communication bus structure as recited in claim 3,
   wherein each of said at least one parallel multiprocessing system bus comprises:
   a module collection bus, operatively connected to said bucket control circuit, said first receiver, said first driver and said multiplexer in a corresponding bus controller and to a bucket of the processing modules, to collect the new data from the bucket of the processing modules; and
   a module distribution bus, operatively connected to said second receiver in the corresponding bus controller and to the bucket of processing modules, to distribute the old data thereto,
   wherein each of said at least one parallel intersystem bus except the return bus comprises;
   a bucket collection bus, connecting said first driver in a preceding bus controller to said first receiver in a following bus controller; and a bucket distribution bus, connecting said second driver in the following bus controller to said second receiver in the preceding bus controller, and wherein the return bus, said bucket collection and distribution buses and said module collection and distribution buses are each unidirectional.

5. A time division multiplex communication bus structure as recited in claim 4, wherein said bucket collection bus, said first receiver, said first driver and said multiplexer together cause a propagation delay in transmission of the new data, and wherein each of said at least one bus controller further comprises a delay circuit, operatively connected to said multiplexer, said first driver and the corresponding system bus, to delay the clock signal by an amount more than the propagation delay.

6. A time division multiplex communication bus structure as recited in claim 5, wherein said oscillator outputs the oscillation signal with an oscillation period, and wherein the delay provided by said delay circuit is less than the oscillation period.

7. A time division multiplex communication bus structure as recited in claim 4, wherein each of said at least one bus controller further comprises a delay circuit, operatively connected to said multiplexer and said first driver, to delay the bucket enable pulse by the length of the bucket enable pulse prior to supplying the bucket enable pulse to any following bus controllers.

8. A time division multiplex communication bus structure as recited in claim 2, wherein each of said at least one bus controller comprises:

control means for generating the clock signal, the bucket enable pulse and a frame signal in the initial bus controller and for obtaining the clock signal, the bucket enable pulse and the frame signal from a preceding bus controller in any other bus controller;

interface means for interfacing with said at least one intersystem bus;

delay means for delaying the clock signal output by said control means by an amount greater than a propagation delay caused by passing through said interface means in two of said at least one bus controller and one of said at least one intersystem bus to produce a delayed clock signal; and first and second pairs of registers, operatively connected to said interface means and the corresponding system bus, said first pair of registers connected together and to said delay means to receive the delayed clock signal as a first latch signal, said second pair of registers connected together and receiving as a second latch signal the clock signal from the return bus via any following bus controllers.

9. A bus controller for a multiprocessor system connected to a plurality of processors via a parallel multiprocessing system bus and at least one parallel intersystem bus, comprising:

control means for outputting a clock signal, a bucket enable pulse and a frame signal selectively obtained from one of a preceding intersystem bus connected thereto and control signals generated therein, in dependence upon whether said bus controller is an initial bus controller in the multiprocessor system;

interface means for interfacing with a following intersystem bus and, if said bus controller is not the initial bus controller, with the preceding intersystem bus;

delay means for delaying the clock signal output by said control means by an amount greater than a propagation delay caused by passing through two of said interface means and one of the at least one intersystem bus to produce a delayed clock signal; and first and second pairs of registers, operatively connected to said interface means and the parallel multiprocessing system bus, said first pair of registers connected together and to said delay means to receive the delayed clock signal as a first latch signal and said second pair of registers connected together and receiving as a second latch signal the clock signal from the following intersystem bus.

10. A bus controller structure as recited in claim 9, wherein said control means comprises:

a counter to count cycles in the clock signal and output a first periodic signal and a count signal;

a bucket control circuit, operatively connected to the parallel multiprocessing system bus, to output a second periodic signal and module control signals for the processors connected to the parallel multiprocessing system bus, in dependence upon the count signal;

an oscillator to output an oscillating signal;

designation means for generating a designation signal indicating whether said bus controller is an initial bus controller; and a multiplexer, operatively connected to said counter, said bucket control circuit, said oscillator, said designation means and the parallel multiprocessing system bus, to output the first and second periodic signals and the oscillating signal as the frame signal, the bucket enable pulse and the clock signal, respectively, when the designation signal received by said multiplexer indicates that said multiplexer is in the initial bus controller and otherwise obtaining the frame signal, the bucket enable pulse and the clock signal from the preceding intersystem bus, wherein said interface means comprises:

first and second receivers, operatively connected to the parallel multiprocessing system bus and each connectable to one of said at least one parallel intersystem bus, said first receiver receiving the new data and collection control signals from the preceding intersystem bus, if any, and said second receiver receiving the old data and distribution control signals from the following intersystem bus; and first and second drivers, operatively connected to said first and second receivers, respectively, and to the parallel multiprocessing system bus and each connectable to one of said at least one parallel intersystem bus, said first driver outputting the new data collected from the processors connected to the parallel multiprocessing system bus followed by the new data received by said first receiver and said second driver outputting the old data received by said second receiver to the preceding intersystem bus, if any.

* * * * *